US012405122B2

(12) United States Patent
Fox

(10) Patent No.: US 12,405,122 B2
(45) Date of Patent: Sep. 2, 2025

(54) METHOD AND APPARATUS FOR DETERMINING FUELING STATION WAIT TIMES

(71) Applicant: TOYOTA MOTOR ENGINEERING & MANUFACTURING NORTH AMERICA, INC., Plano, TX (US)

(72) Inventor: Dallas K. Fox, Yorba Linda, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

(*) Notice: Subject to any disclaimer, the term of this patent is extended or adjusted under 35 U.S.C. 154(b) by 149 days.

(21) Appl. No.: 17/660,812

(22) Filed: Apr. 26, 2022

(65) Prior Publication Data

US 2023/0341231 A1   Oct. 26, 2023

(51) Int. Cl.
*G01C 21/34* (2006.01)
*B60K 15/03* (2006.01)
*G06Q 50/06* (2024.01)
*G07C 5/00* (2006.01)

(52) U.S. Cl.
CPC ......... *G01C 21/3476* (2013.01); *G06Q 50/06* (2013.01); *G07C 5/004* (2013.01); *B60K 15/03* (2013.01); *B60K 2015/03217* (2013.01); *B60K 2015/03315* (2013.01)

(58) Field of Classification Search
CPC ............ G01C 21/3476; G01C 21/3469; G01C 21/3682; G06Q 50/06; G07C 5/004; G07C 5/02; B60K 2015/03217; B60K 2015/03315; B60K 15/03

USPC ......................................................... 701/400
See application file for complete search history.

(56) References Cited

U.S. PATENT DOCUMENTS

| | | | |
|---|---|---|---|
| 9,228,847 B2 | 1/2016 | Guo et al. | |
| 9,671,241 B2 | 6/2017 | Tang | |
| 9,851,213 B2 | 12/2017 | Oh et al. | |
| 9,927,778 B2 * | 3/2018 | Mailloux | G05B 11/01 |
| 10,373,238 B2 | 8/2019 | Hill | |

(Continued)

FOREIGN PATENT DOCUMENTS

| | | |
|---|---|---|
| CN | 106369270 A | 2/2017 |
| CN | 111878700 A | 11/2020 |

(Continued)

*Primary Examiner* — Kenny Nguyen
(74) *Attorney, Agent, or Firm* — HAYNES AND BOONE, LLP

(57) ABSTRACT

A system is provided for estimating the time required for a vehicle to visit a fueling station. The system includes a fueling station server associated with the fueling station and configured to transmit, over a network, a plurality of fueling station parameters. The system also includes sensors within the vehicle; a navigation system configured to provide navigation data; and a non-transitory memory storing fuel tank parameters for the vehicle. The system also includes a processor within the vehicle configured to: based on the navigation data, determine a travel time required for the vehicle to reach the fueling station; based on the fueling station parameters, sensor data, and the fuel tank parameters, compute a fueling time required for the fueling station to fill the fuel tank; and compute a total time requirement, including the travel time and the fueling time.

17 Claims, 6 Drawing Sheets

(56) References Cited

U.S. PATENT DOCUMENTS

| | | | |
|---|---|---|---|
| 10,409,285 B2* | 9/2019 | Bostick | G05D 1/0297 |
| 10,493,861 B2* | 12/2019 | Cun | B60L 53/66 |
| 10,800,281 B2 | 10/2020 | Boisen et al. | |
| 10,856,104 B2* | 12/2020 | Sakurada | H04W 4/021 |
| 11,034,338 B2* | 6/2021 | Lei | B60S 5/02 |
| 11,183,001 B2* | 11/2021 | Lowenthal | B60L 53/65 |
| 11,263,672 B2* | 3/2022 | Pancheri | G06Q 30/0282 |
| 11,397,092 B2* | 7/2022 | DeLuca | G01C 21/3415 |
| 12,202,372 B2* | 1/2025 | Maeda | G06Q 10/02 |
| 2011/0093305 A1* | 4/2011 | Alexander | G06Q 10/06311 |
| | | | 705/7.13 |
| 2011/0288765 A1* | 11/2011 | Conway | G08G 1/096816 |
| | | | 701/533 |
| 2012/0109519 A1* | 5/2012 | Uyeki | B60L 53/68 |
| | | | 701/426 |
| 2015/0012385 A1* | 1/2015 | Bahnsen | G06Q 30/06 |
| | | | 705/26.61 |
| 2016/0153796 A1* | 6/2016 | Stankoulov | G01C 21/3469 |
| | | | 701/123 |
| 2016/0300162 A1* | 10/2016 | McManus | G07B 15/02 |
| 2017/0074707 A1* | 3/2017 | Mathison | G01F 22/02 |
| 2018/0143029 A1* | 5/2018 | Nikulin | G01C 21/3415 |
| 2018/0300823 A1* | 10/2018 | Aubuchon | G06Q 20/322 |
| 2019/0009683 A1* | 1/2019 | Saito | G06Q 10/06 |
| 2019/0050918 A1* | 2/2019 | Pancheri | G06Q 50/06 |
| 2020/0180571 A1* | 6/2020 | Lei | G06Q 50/06 |
| 2021/0050918 A1* | 2/2021 | Rekaya | H04B 10/2525 |
| 2021/0278045 A1* | 9/2021 | Yoshida | F17C 13/025 |
| 2022/0107194 A1* | 4/2022 | Hagström | G01C 21/3697 |
| 2022/0187091 A1* | 6/2022 | Suzuki | G08G 1/00 |
| 2023/0234468 A1* | 7/2023 | Maeda | B60L 53/67 |
| | | | 320/109 |
| 2023/0298112 A1* | 9/2023 | Stephen | G06Q 10/02 |
| | | | 705/5 |
| 2023/0341233 A1* | 10/2023 | Miller, Jr. | G01C 21/3476 |
| 2024/0377209 A1* | 11/2024 | Chon | G01C 21/3469 |

FOREIGN PATENT DOCUMENTS

| | | |
|---|---|---|
| CN | 112356721 A | 2/2021 |
| CN | 113222387 A | 8/2021 |
| CN | 113420382 A | 9/2021 |
| KR | 20110077659 A | 7/2011 |
| KR | 101385371 | 4/2014 |
| WO | 2007059781 A1 | 5/2007 |
| WO | 2022015712 A1 | 1/2022 |

\* cited by examiner

METHOD AND APPARATUS FOR DETERMINING FUELING STATION WAIT TIMES

TECHNICAL FIELD

The subject matter described herein relates to devices and methods for estimating the wait times at fueling stations. This technology has particular but not exclusive utility for hydrogen-powered cars and trucks.

BACKGROUND

For traditional gasoline- and diesel-fueled motor vehicles, fueling stations are generally plentiful in populated areas, such that waiting in line for fuel does not present an undue burden to the vehicle owner. For alternative vehicles such as electric, liquified natural gas (LNG), and hydrogen-fueled vehicles, this may not necessarily be the case. Electric vehicles may have the added burden of limited range and slow charging rates.

Hydrogen-fueled vehicles such as the Toyota Mirai include characteristics that may significantly affect the frequency of refueling and the time required to refuel. For example, different hydrogen fuel tanks can vary in their maximum capacity, which can thus limit the range of the vehicle, and some hydrogen fuel tanks (e.g., plastic-lined tanks) must be filled relatively slowly as compared to other tanks (e.g., aluminum-lined tanks) to prevent overheating of the liner. Hydrogen fueling stations are currently rare, such that travel times to the nearest fueling station may be significant, and the demand for hydrogen fuel may at times exceed the supply, or may result in long lines at fueling stations. Hydrogen fuel may need to be pressurized and pre-chilled prior to being dispensed into a vehicle, which can take additional time.

Currently, the issues with hydrogen-fueled vehicles are addressed in limited ways. For example, hydrogen fueling stations communicate with a Station Operational Status System (SOSS) that shows their current status (e.g., on a website or mobile app). Status values may for example include "Online" (e.g., this station is available to fuel vehicles), "Offline" (e.g., this station is not available), "limited" (e.g., only giving partial fills), "refreshing" (e.g., pressurizing, pre-chilling, or refilling the storage tanks), and other such terse messages (or icons/symbols representative of the messages). SOSS may also report the total amount of fuel (e.g., in kilograms or kg) currently available at the fueling station. Such information may only be updated at specific intervals (e.g., every 15 minutes), and may provide little insight to the consumer as to whether a trip to that station is advisable.

In addition, the fueling station may communicate with the vehicle by means of an infrared connection associated with the hydrogen fuel nozzle, such that the station is aware of the temperature and pressure of the hydrogen in the vehicle's tanks. Similarly, the fueling station may also be aware of the vehicle's maximum capacity, maximum fill rate, and current fill amount (e.g., in kg). However, such information is only available while the vehicle is being fueled, and may thus be of limited use for the consumer in deciding whether to visit a given fueling station.

Such shortcomings of the hydrogen fueling infrastructure may limit adoption of hydrogen-fueled vehicles. Thus, a need exists for improved fuel-related information systems that address these and other concerns.

The information included in this Background section of the specification, including any references cited herein and any description or discussion thereof, is included for technical reference purposes only and is not to be regarded as limiting.

SUMMARY

The present disclosure provides a fuel queue management system that incorporates data from the fueling station, the ego vehicle, and from other vehicles within the fueling station, to determine the total time required for the ego vehicle to obtain fuel from the fueling station.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for estimating the time required for a vehicle to visit a fueling station. The system includes a fueling station server associated with the fueling station and configured to transmit, over a network, a plurality of fueling station parameters associated with the fueling station. The system also includes a plurality of sensors disposed within the vehicle and configured to detect sensor data associated with the vehicle. The system also includes a navigation system configured to provide navigation data related to the vehicle and the fueling station. The system also includes a non-transitory computer readable medium storing fuel tank parameters associated with a fuel tank of the vehicle. The system also includes a processor disposed within the vehicle and configured to: based on the navigation data, determine a travel time required for the vehicle to reach the fueling station; based on the fueling station parameters, the sensor data, and the fuel tank parameters, compute a fueling time required for the fueling station to fill the fuel tank; and compute a total time requirement, including the travel time and the fueling time. Other embodiments of this aspect include corresponding computer systems, apparatus, and computer programs recorded on one or more computer storage devices, each configured to perform the actions of the methods.

Implementations may include one or more of the following features. In some embodiments, the processor is further configured to: receive, over the network, a respective plurality of waiting vehicle parameters from each of at least one waiting vehicle associated with the fueling station; based on the fueling station parameters and the respective waiting vehicle parameters of the at least one waiting vehicle, compute a wait time associated with the at least one waiting vehicle; and compute the total time requirement, further including the wait time. In some embodiments, the processor is further configured to report the total time requirement to a driver of the vehicle. In some embodiments, the navigation system is further configured to provide second navigation data related to the vehicle and the second fueling station, where the processor is further configured to: based on the second navigation data, compute a second travel time required for the vehicle to reach the second fueling station; based on the second fueling station parameters, the sensor data, and the fuel tank parameters, compute a second fueling time required for the second fueling station to fill the fuel tank; receive, over the network, from each of at least one waiting second vehicle associated with the second fueling station, a respective plurality of waiting second vehicle parameters; based on the fueling station parameters and the respective waiting second vehicle parameters of the at least one waiting second vehicle, compute a second wait time associated with the at least one waiting second vehicle; and compute a second total time requirement, including the second travel time, the second fueling time, and the second wait time. In some embodiments, the processor is further configured to: compare the total time requirement to the second total time requirement; and report the total time requirement and the second total time requirement to a driver of the vehicle, where the total time requirement and the second total time requirement are ranked from smallest to largest. In some embodiments, the processor is further configured to display, on a display, a location of the vehicle, a location of the fueling station, and a location of the second fueling station. In some embodiments, the processor is further configured to display at least a portion of the navigation data or the second navigation data. In some embodiments, the waiting vehicle parameters include at least one of a pressure class of the waiting vehicle, a tank capacity of the waiting vehicle, a tank type of the waiting vehicle, a current fill level, a fuel pressure, or a fuel temperature. In some embodiments, the at least one waiting vehicle is located within a geofenced area associated with the fueling station. In some embodiments, the wait time includes a delay time between the end of a refueling of a waiting vehicle of the at least one waiting vehicle and the start of a refueling of a next waiting vehicle of the at least one waiting vehicle. In some embodiments, the wait time includes a delay time between the end of a refueling of a waiting vehicle of the at least one waiting vehicle and the start of a refueling of the vehicle. In some embodiments, the fueling station parameters include at least one of a location of the fueling station, a quantity of fuel, a temperature of the fuel, a pressure of the fuel, a number of dispensing nozzles available, an expected pre-cool time, an expected recompression time, a number of waiting vehicles, an identify of one or more waiting vehicles, a partial fill amount, an expected time of next fuel delivery, or an expected amount of next fuel delivery. In some embodiments, the fuel tank data includes at least one of a pressure class of the fuel tank, a capacity of the fuel tank, or a tank type of the fuel tank. In some embodiments, the sensor data includes at least one of a current fill level of the fuel tank, a fuel pressure, or a fuel temperature. In some embodiments, the processor is further configured to: receive, over the network, a number of waiting vehicles associated with the fueling station; based on the number of waiting vehicles, estimate a wait time associated with the number of waiting vehicles; and compute the total time requirement, further including the wait time. Implementations of the described techniques may include hardware, a method or process, or computer software on a computer-accessible medium.

One general aspect includes a method for estimating the time required for a vehicle to visit a fueling station. The method includes receiving, over a network, from a fueling station server associated with the fueling station, a plurality of fueling station parameters associated with the fueling station. The method also includes detecting, with a plurality of sensors disposed within the vehicle, sensor data associated with the vehicle. The method also includes detecting, with a navigation system, navigation data related to the vehicle and the fueling station. The method also includes retrieving, from a non-transitory computer readable medium, fuel tank parameters associated with a fuel tank of the vehicle. The method also includes, with a processor disposed within the vehicle: based on the navigation data, computing a travel time required for the vehicle to reach the fueling station; based on the fueling station parameters, the sensor data, and the fuel tank parameters, computing a fueling time required for the fueling station to fill the fuel tank; and computing a total time requirement, including the travel time and the fueling time. Other embodiments of this aspect include corresponding computer systems, apparatus, and computer programs recorded on one or more computer storage devices, each configured to perform the actions of the methods.

Implementations may include one or more of the following features. In some embodiments, the method further includes, with the processor: receiving, over the network, a respective plurality of waiting vehicle parameters from each of at least one waiting vehicle associated with the fueling station; based on the fueling station parameters and the respective waiting vehicle parameters of the at least one waiting vehicle, computing a wait time associated with the at least one waiting vehicle; and computing the total time requirement, further including the wait time. In some embodiments, the method further includes, with the processor, reporting the total time requirement to a driver of the vehicle. In some embodiments, the method further includes: receiving, over the network, from a second fueling station server associated with a second fueling station, a plurality of second fueling station parameters associated with the second fueling station; and receiving, over the network, from each of at least one waiting second vehicle associated with the second fueling station, a respective plurality of waiting second vehicle parameters; determining, with the navigation system, second navigation data related to the vehicle and the second fueling station; and with the processor: based on the second navigation data, computing a second travel time required for the vehicle to reach the second fueling station; based on the second fueling station parameters, the sensor data, and the fuel tank parameters, computing a second fueling time required for the second fueling station to fill the fuel tank; and based on the fueling station parameters and the respective waiting second vehicle parameters of the at least one waiting second vehicle, computing a second wait time associated with the at least one waiting second vehicle; and computing a second total time requirement, including the second travel time, the second fueling time, and the second wait time. In some embodiments, the total time requirement and the second total time requirement are ranked from smallest to largest. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the fuel queue management system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
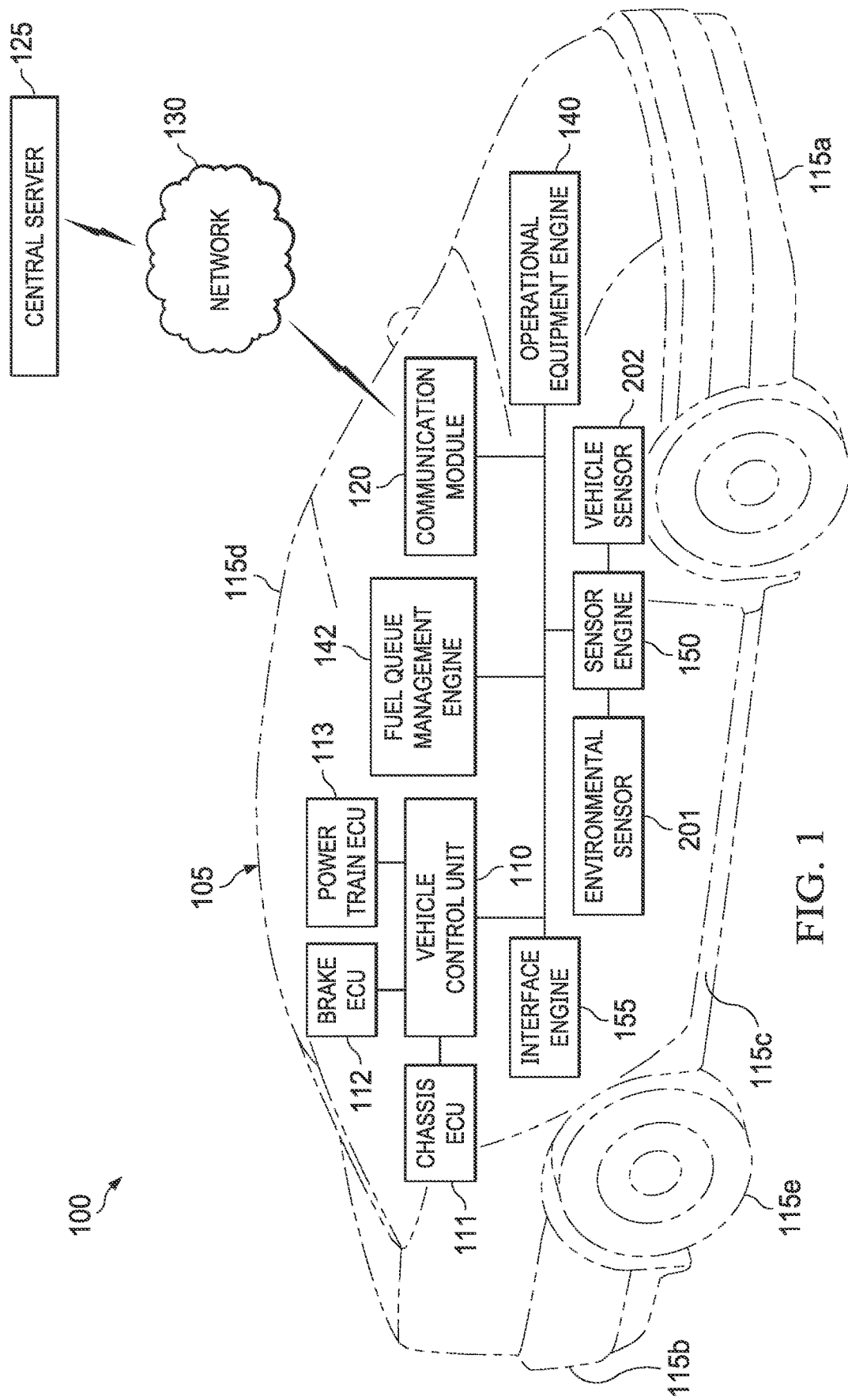
FIG. 1 is a diagrammatic illustration, in a block diagram form, of a fuel queue management system in accordance with at least one embodiment of the present disclosure.

In accordance with at least one embodiment of the present disclosure, a fuel queue management system is provided that provides a fuel queue management system which incorporates data (e.g., sensor data, or variables computed using sensor data) from one or more fueling stations, from the ego vehicle, and from other vehicles within the fueling station, to determine the total time required for the ego vehicle to obtain fuel from the fueling station. Such information may be used by the consumer or vehicle owner to, for example, select which fueling station to use, or to determine whether it would be advantageous to refuel the vehicle at a different time.

The present disclosure aids substantially in time management for refueling of the vehicle, by improving real-time estimates of the time such refueling will take. Implemented on one or more processors within the vehicle, the fuel queue management system disclosed herein provides practical, real-time or near-real-time calculation of refueling times, possibly including expected travel time to the fueling station. This improved fuel queue management transforms a process based largely on guesswork (e.g., due to insufficient information) into one based on a more detailed understanding of the current status of the vehicle and fueling station, without the normally routine need to drive to the fueling station to see how many vehicles are waiting. This unconventional approach improves the functioning of the fueling station and the fueling station infrastructure, by allowing consumers to refuel at times and locations where their total time expenditure may be minimized.

The fuel queue management system may be implemented as a combination of hardware and/or software modules, and operated by a control process executing on a processor circuit that accepts user inputs from the vehicle operator, and that is in communication with processors in one or more fueling stations and one of more other vehicles. In that regard, the control process performs certain specific operations in response to different inputs made at different times. Certain structures, functions, and operations of the processor circuit, sensors, and user input systems are known in the art, while others are recited herein to enable novel features or aspects of the present disclosure with particularity.

These descriptions are provided for exemplary purposes only, and should not be considered to limit the scope of the fuel queue management system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration, in a block diagram form, of a fuel queue management system, in accordance with at least one embodiment of the present disclosure. In an example, a fuel queue management system is referred to by the reference numeral 100 and includes a vehicle (or ego vehicle) 105, such as an automobile, and a vehicle control unit (VCU) 110 located on the vehicle 105. The vehicle 105 may include a front portion 115$a$ (including a front bumper), a rear portion 115$b$ (including a rear bumper), a right side portion 115$c$ (including a right front quarter panel, a right front door, a right rear door, and a right rear quarter panel), a left side portion 115$d$ (including a left front quarter panel, a left front door, a left rear door, and a left rear quarter panel), and wheels 115$e$. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like, including communicating via a combination of one or more or networks). The central server 125 may provide information and services including but not limited to include location, mapping, route or path, and topography information. In some embodiments, there may be multiple servers 125, each associated with a different fueling station.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the fuel queue management system 100.

The term "engine" is meant herein to refer to an agent, instrument, or combination of either, or both, agents and instruments that may be associated to serve a purpose or accomplish a task—agents and instruments may include sensors, actuators, switches, relays, motors or power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125. In some cases, an engine may incorporate or make use of multiple processors or software modules.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a fuel queue management engine 142, the operation of which will be described below.

It is understood that other components or arrangements of components may be found in a vehicle 105, and that at least some of the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
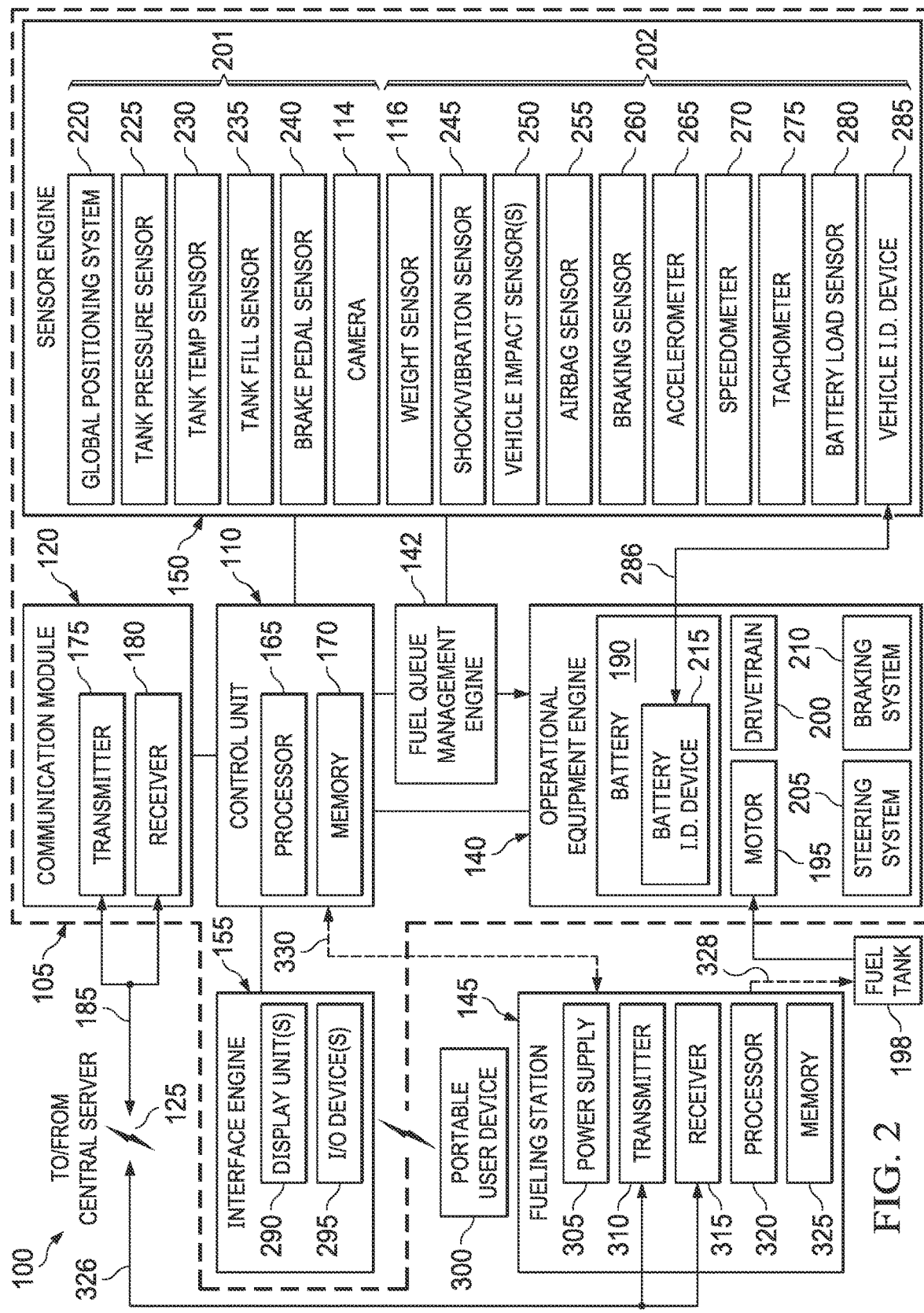
FIG. 2 is a diagrammatic illustration, in a block-diagram form, of at least a portion of the fuel queue management system of FIG. 1, in accordance with at least one embodiment of the present disclosure.

FIG. 2 is a diagrammatic illustration, in a block-diagram form, of at least a portion of the fuel queue management system 100 of FIG. 1, in accordance with at least one embodiment of the present disclosure. It is noted that the sub-components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain or transmission 200, a steering system 205, and a braking system 210. In some vehicles, the vehicle battery 190 may provide electrical power to the motor 195 to drive the wheels 115e of the vehicle 105 via the drivetrain 200. In some examples, the motor 195 is an internal combustion motor and the battery operates a starter of the motor 195. In such embodiments, the motor 195 may be operably connected to a fuel tank 198 that is configured to contain fuel. In an example, the fuel tank 198 is a type III (aluminum-lined) or type IV (plastic lined) pressure vessel (e.g., a carbon fiber tank) capable of storing 4-6 kg of compressed hydrogen gas at a pressure of 35-70 megapascals (MPa) (350-700 Barr or 5076-10,152 pounds per square inch (psi)).

In some examples, instead of or in addition to providing power to the motor 195, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system (GPS) or other positioning sensor 220 (e.g., GLONASS, Galileo, LORAN, WiFi triangulation, radio broadcast tower triangulation, or cell tower triangulation system, etc.), fuel tank pressure sensor 225, fuel tank fill level sensor 230, fuel tank temperature sensor 235, brake pedal deflection sensors 240, a shock/vibration sensor 245, a vehicle impact sensor 250, an airbag sensor 255, a braking sensor 260, an accelerometer or acceleration sensor 265, a speedometer 270, a tachometer 275, a battery load sensor 280, a vehicle identification device 285, a 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin, engine compartment, battery, or fuel tank. Sub-components of the sensor engine 150 may be deployed at any operational area where information on the driving of the vehicle 105 may occur. Readings from the sensor engine 150 may be fed back to the vehicle control unit 110, brake ECU 112, power train ECU or hybrid ECU 113, and/or fuel queue management engine 142. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110 or brake ECU 112. The accelerometer 265 is adapted to monitor acceleration of the vehicle 105 and to communicate the acceleration information to the vehicle control unit 110, hybrid ECU/power train ECU 113, or fuel queue management engine 142. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed or angular velocity (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which may be operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dashboard or head unit, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, hand-held devices, laptops, audio devices, tablet computers, game consoles, cameras, and/or any other suitable devices. In several examples, the portable user device 300 is a smartphone such as, for example, an iPhone® by Apple Incorporated.

Also visible is a vehicle fueling station 145, which supplies fuel 328 (e.g., compressed hydrogen gas) to the operational equipment engine 140 (e.g., to the fuel tank 198), and may include such components as a power supply 305, transmitter 310, receiver 315, processor 320, and memory 325.

The fuel queue management system 100 also includes a fuel queue management engine 142, the operation of which will be described below. In some embodiments, the fuel queue management engine 142 comprises a standalone housing with its own processor and memory. In other embodiments, the fuel queue management engine 142 exists as software, firmware, or hardware within another processor, such as the vehicle control unit 110, operational equipment engine 140, brake ECU 112, or power train ECU/hybrid ECU 113. The sensor engine 150 includes environmental sensors 201 and vehicle sensors 202.

It is understood that other components or arrangements of components may be found in a vehicle 105, and that the same general principles apply to electric vehicles, internal combustion vehicles, and hybrid vehicles.

Figure 3:
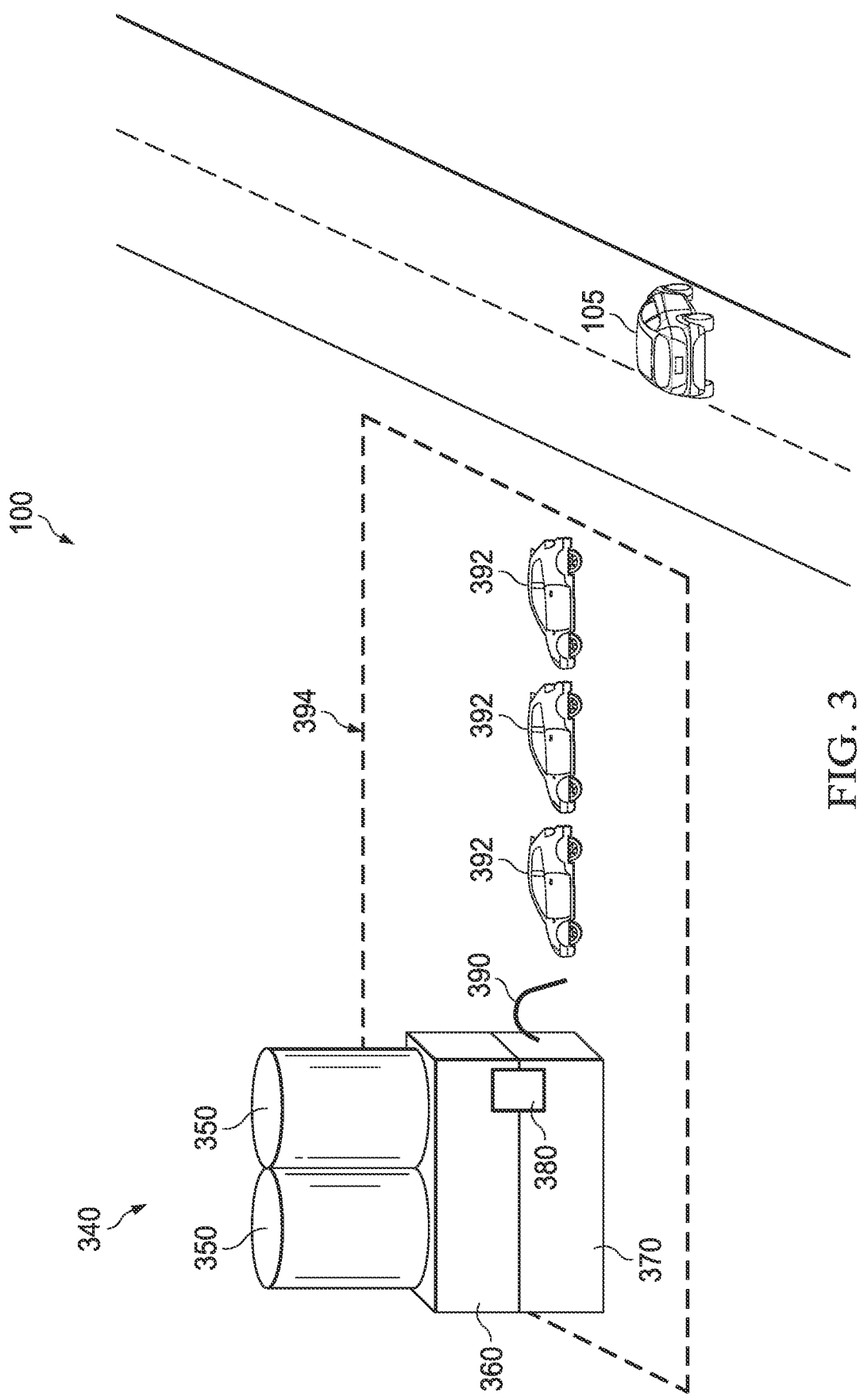
FIG. 3 is a diagrammatic illustration of at least a portion of an example fuel queue management system, in accordance with at least one embodiment of the present disclosure.

FIG. 3 is a diagrammatic illustration of at least a portion of an example fuel queue management system 100, in accordance with at least one embodiment of the present disclosure. In the example shown in FIG. 3, the fuel queue management system 100 includes the ego vehicle 105, a fueling station 340 within a geofenced area 394, and a number of waiting vehicles 392. The fueling station 340 includes fuel storage tanks 350, a compressor 360, a pre-chiller 370, a number of sensors 380, and one or more fill nozzles 390.

In an example, the storage tanks 350 are capable of storing compressed hydrogen gas at approximately ambient temperatures, at a pressure of up to 90 MPa. In an example, the compressor 360 is capable of compressing low-pressure hydrogen gas to a pressure of up to 90 MPa, of compressing low-pressure hydrogen gas to a higher vehicle delivery pressure of, for example, 35 MPa or 70 MPa, and/or of expanding high-pressure hydrogen gas to the lower vehicle delivery pressure. In an example, the pre-chiller 370 is configured to cool compressed hydrogen gas to temperatures as low as −40° C. In an example, the nozzle 390 is configured to deliver hydrogen gas to a vehicle 105 or 392 at the delivery pressure. In an example, the sensors 380 are configured to measure the mass, pressure, and temperature of the hydrogen gas in the storage tanks 350. In some embodiments, the sensors 380 may also identify a vehicle 392 that is currently fueling and/or other vehicles 392 within the geofenced area that may be waiting in line for an opportunity to refuel.

Figure 4:
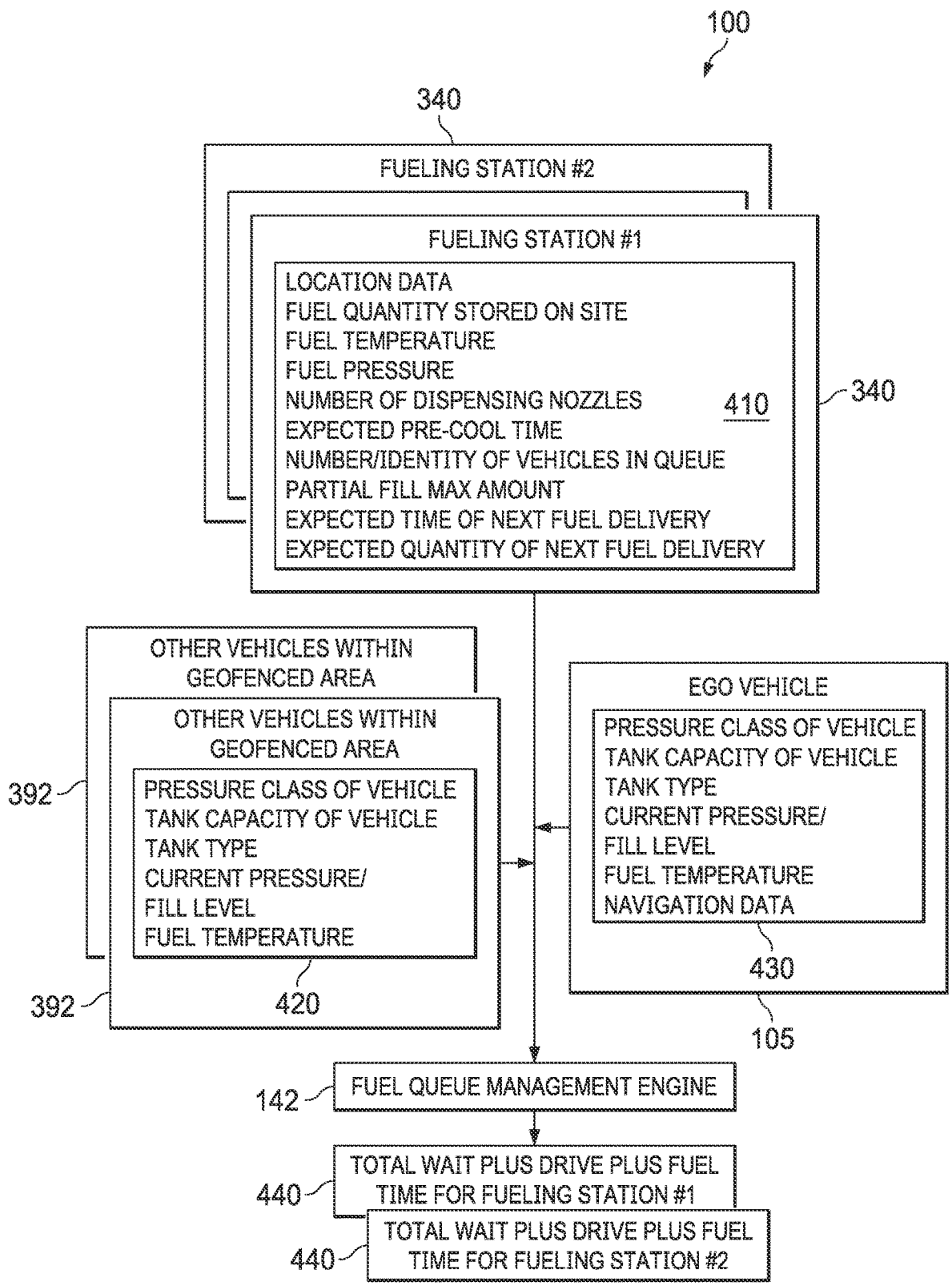
FIG. 4 is a diagrammatic illustration, in a block-diagram form, of at least a portion of an example fuel queue management system, in accordance with at least one embodiment of the present disclosure.

FIG. 4 is a diagrammatic illustration, in a block-diagram form, of at least a portion of an example fuel queue management system 100, in accordance with at least one embodiment of the present disclosure. In the example shown in FIG. 5, the system includes the ego vehicle 105, a plurality of fueling stations 340, and a plurality of other vehicles 392 that are located within the respective geofenced areas of one or more of the fueling stations 340.

The fueling stations 340 each report (e.g., over a wireless network such as a cellular network, wireless internet, etc.) a number of fueling station parameters. The fueling station parameters 410 may for example include, but are not limited to, location data for the fueling station, the amount of fuel stored on site (e.g., in kilograms), the temperature of the fuel (e.g., in ° C.) stored on site, the number of dispensing nozzles currently available, the expected time required to pre-cool a quantity of fuel, the expected time to dispense a quantity of fuel, and the expected time to recompress between fillings. In some embodiments, the fueling station parameters 410 may also include additional parameters such as the number and/or identity of vehicles detected within the station's geofenced area, the maximum amount of fuel the station will dispense per vehicle, and the expected time and quantity of a future fuel delivery to the fueling station 410.

In some embodiments, the other vehicles 392 report vehicle parameters 420, which can include but are not limited to the pressure class of the vehicle (e.g., in MPa), the tank capacity of the vehicle (e.g., in kg), the tank type of the vehicle, the current fill level of the vehicle (e.g., in kg), and the temperature of the vehicle's fuel tank.

The ego vehicle 105 may also retrieve, detect, or calculate ego vehicle parameters 430, which may include but are not limited to fuel tank parameters such as the pressure class of the vehicle (e.g., in MPa), the tank capacity of the vehicle (e.g., in kg), the tank type, and sensor measurements such as the current fill level of the tank (e.g., in kg), the current pressure of the tank (e.g., in MPa), the temperature of the fuel tank, and navigation data. The navigation data may for example include the ego vehicle's current position, along with estimated travel times to one or more of the fueling stations 340 (e.g., as reported by a mapping service such as Google Maps). In some embodiments, the fuel tank parameters may be stored in a non-transitory memory such as a ROM or flash memory.

The fueling station parameters 410, vehicle parameters 420, and ego vehicle parameters 430 are received by the fuel queue management engine 142, which computes the time 440 required to refuel the ego vehicle at that particular fueling station.

In an example, the total time required to refuel the ego vehicle at a given fueling station can be computed as the sum of travel time to the station, estimated wait time at the station, and the time required to fill the fuel tank of the ego vehicle. This can be shown as:

$$T_{total} = T_{travel} + T_{wait} + T_{fuel} \quad (1)$$

where $T_{travel}$=the estimated GPS travel time from the ego vehicle's current position to the fueling station position. Wait time is a function of the number of vehicles waiting at the station, the number of nozzles available to service the vehicles, the amount of time required to refuel each vehicle, and a delay time between the end of one vehicle's refueling and the start of the next vehicle's refueling. Thus, where n is the number of vehicles and z is the number of nozzles:

$$T_{wait} = n/z \sum_{i=1}^{n} (T_{fuel_i} + T_{delay}) \quad (2)$$

For each vehicle i, and also for the ego vehicle, the time required to fuel the vehicle may be a function of the amount of fuel to be pumped and the flowrate of the fuel, which is equal to the difference between the capacity C and the current fill level L of the vehicle's fuel tank. Flowrate a function of the pressure differential between the fueling station and the vehicle's fuel tank, the temperature of the fuel, and the tank class of the vehicle (e.g., plastic-lined tanks may require slower filling than metal-lined tanks due to temperature limits or other factors). Depending in the implementation, flowrate may be derived from an equation, a lookup table, a machine learning (ML) model, or otherwise. Thus:

$$T_{fuel}(C-L)*f(P_{station}, P_{vehicle}, \text{Temp}_{fuel}, \text{Tank class}) \quad (3)$$

In an example, at a fuel station fuel temperature of 20° C., a vehicle with a completely empty, aluminum-lined fuel tank with a capacity of 5.6 kg may require 4-6 minutes to completely fill the tank. If the average delay between vehicles is equal to two minutes, and five such vehicles are waiting in line, then the total expected wait time would be around 35 minutes.

In some cases, a fueling station with a limited supply of fuel on hand may be offering only partial tank fills, such as a maximum of 2 kg or 3 kg of fuel per customer. In other cases, vehicles within a station's geofenced area may not be reporting their respective vehicle parameters 420. In such cases, the fill time for the non-reporting vehicle may be estimated based on a range of normal vehicle fill times (e.g., between 2 and 10 minutes). A person of ordinary skill in the art will appreciate that in such cases, and others, the computations described above may be adjusted accordingly. Communication between the vehicles 392, fueling stations 340, and ego vehicle 105 may be peer-to-peer, or may be routed through a central server. Any of the vehicles 392, fueling stations 340, or ego vehicle 105 may at certain times act as a client, server, or combinations thereof.

Block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Figure 5:
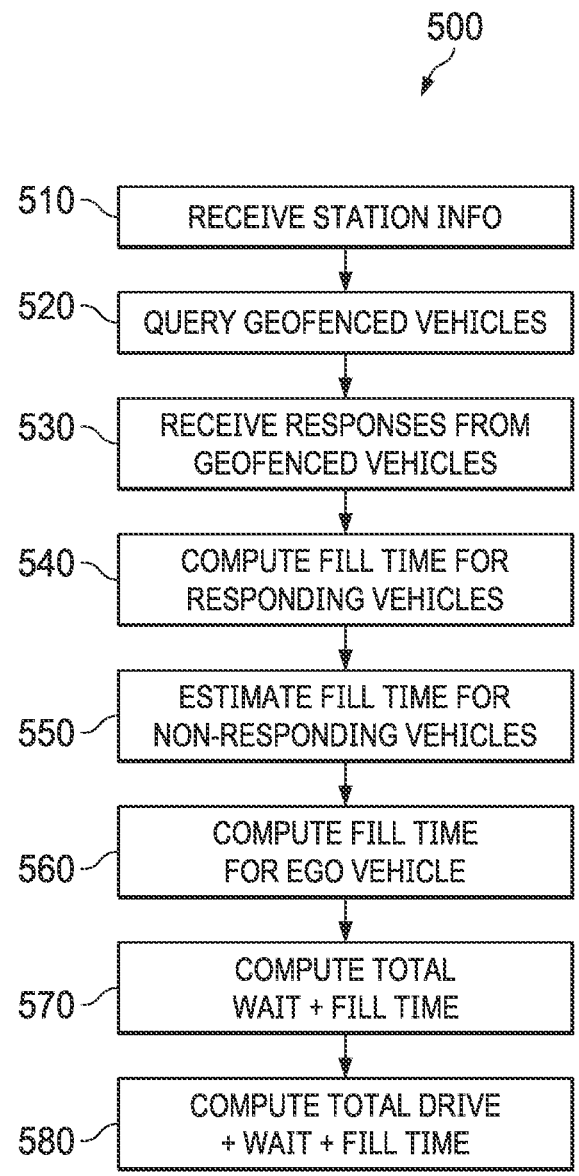
FIG. 5 is a flow diagram of an example fuel queue management method, in accordance with at least one embodiment of the present disclosure.

FIG. 5 is a flow diagram of an example fuel queue management method 500, in accordance with at least one embodiment of the present disclosure. It is understood that the steps of method 500 may be performed in a different order than shown in FIG. 5, additional steps can be provided before, during, and after the steps, and/or some of the steps described can be replaced or eliminated in other embodiments. One or more of steps of the method 500 can be carried by one or more devices and/or systems described herein, such as components of the fuel queue management engine 142, vehicle control unit 110, and/or processor circuit 750.

In step 510, the method 500 includes receiving fueling station information from one or more fueling stations. Execution then proceeds to step 520.

In step 520, the method 500 includes querying one or more vehicles located within the geofenced areas of one or more of the fueling stations. Execution then proceeds to step 530.

In step 530, the method 500 includes receiving responses from one or more of the vehicles located within the geofenced areas of one or more of the fueling stations, where the responses include vehicle information for the responding vehicles. In some embodiments, the vehicles within the geofenced areas may broadcast their vehicle information without needing to be queried. Execution then proceeds to step 540.

In step 540, the method 500 includes computing fill times for the vehicles within the geofenced areas. Execution then proceeds to step 550.

In step 550, the method 500 includes estimating fill times for vehicles believed to be within a geofenced area, but for which no vehicle information is available. Execution then proceeds to step 560.

In step 560, the method 500 includes computing the fill time for the ego vehicle. Execution then proceeds to step 570.

In step 570, the method 500 includes computing the total wait time (e.g., the sum of all the fill times of the vehicles within a given geofenced area), plus the total fill time for the ego vehicle. Execution then proceeds to step 580.

In step 580, the method 500 includes computing the total drive time, wait time, and ego vehicle fill time for one or more of the fueling stations, plus the total time as described above. Results may be displayed in this step, as described below in FIG. 6. The method is now complete.

Flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, the system may wirelessly receive information from a plurality of waiting vehicles, spread across a plurality of fueling stations, and determine a total time required to refuel at each fueling station, in a time period short enough that the time required to perform the calculation is near of below the threshold of notice for the driver of the ego vehicle.

Figure 6:
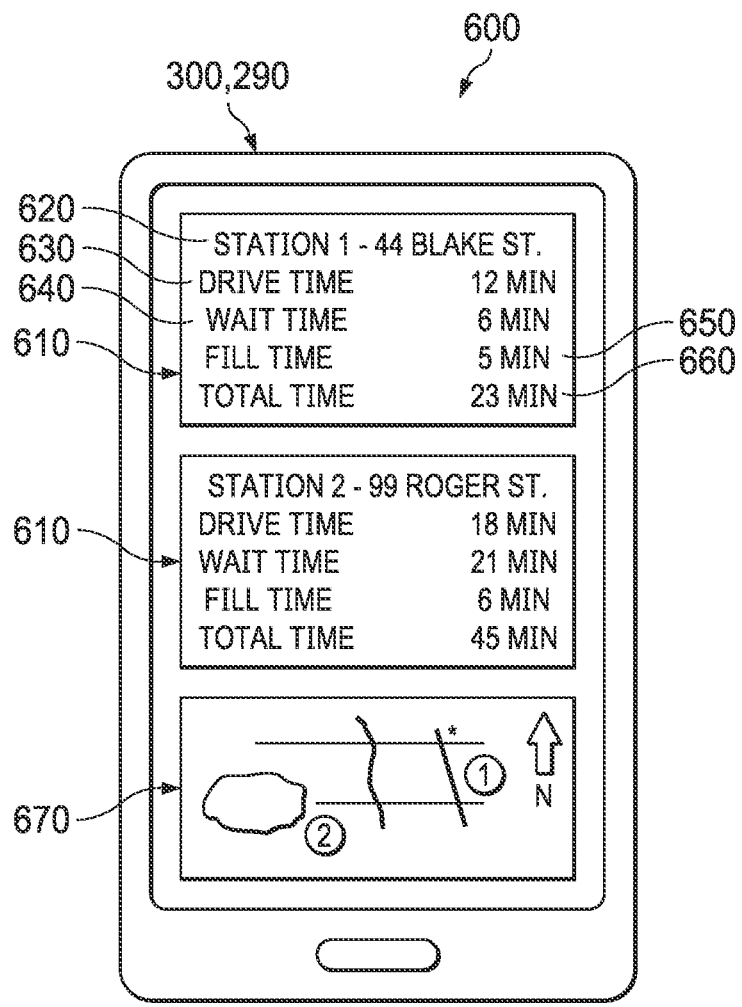

FIG. 6 is a representation of a screen display 600 of an example fuel queue management system 100, in accordance with at least one embodiment of the present disclosure. The screen display 600 may for example be shown on a portable device 300, a display unit 290, or otherwise. In the example shown in FIG. 6, the screen display 600 includes two station reports 610 and a map 670. In an example, total time to refuel may be computed for all fueling stations that are within the projected range of the ego vehicle, and the stations with the shortest total times (e.g., the shortest 1, 2, or 3 stations) may each be represented on the screen display 600 with a station report 610. The station report 610 for a given station may include a station identifier 620 (e.g., the name and address of the fueling station), along with the total time 660 required to refuel at that station. In some embodiments, the station report 610 may include a more detailed breakdown of the total time, including for example the drive time or travel time 630, the total wait time 640, and the ego vehicle's fill time 650.

The map 670 may for example show the ego vehicle's current location, as well as the locations of the fueling stations shown in the station reports 610. In some embodiments, the map 670 include, or may be replaced by, driving directions. In some embodiments, instead of or in addition to the screen display 600, the same or similar information may be presented in audio format, 3D graphics, or otherwise.

Figure 7:
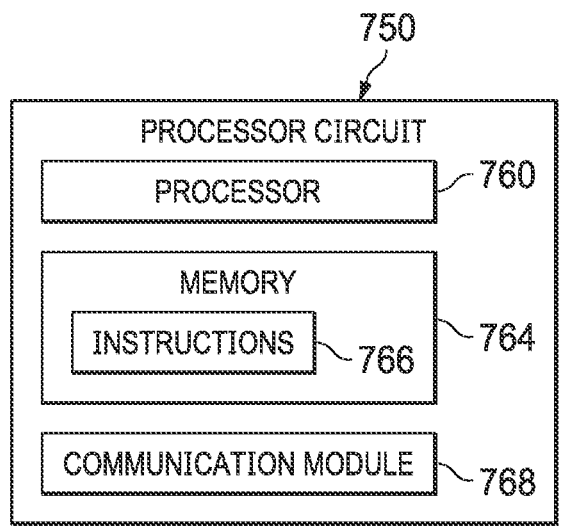
FIG. 7 is a diagrammatic illustration, in a block-diagram form, of a processor circuit, in accordance with at least one embodiment of the present disclosure.

FIG. 7 is a schematic diagram of a processor circuit 750, according to embodiments of the present disclosure. The processor circuit 750 may be implemented in the fuel queue management engine 142 or VCU 110 of FIGS. 1 and 2, the portable device 300 of FIGS. 2 and 6, as part of the fueling station 340 of FIG. 3, as part of another vehicle 392, or in other devices or workstations (e.g., third-party workstations, network routers, etc.), or on a cloud processor or other remote processing unit, as necessary to implement the method. As shown, the processor circuit 750 may include a processor 760, a memory 764, and a communication module 768. These elements may be in direct or indirect communication with each other, for example via one or more buses.

The processor 760 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 760 may also comprise another hardware device, a firmware device, or any combination thereof configured to perform the operations described herein. The processor 760 may also be implemented as a combination of computing devices, e.g., a combination of a DSP and a microprocessor, a plurality of microprocessors, one or more microprocessors in conjunction with a DSP core, or any other such configuration.

The memory 764 may include a cache memory (e.g., a cache memory of the processor 760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 764 includes a non-transitory computer-readable medium. The memory 764 may store instructions 766. The instructions 766 may include instructions that, when executed by the processor 760, cause the processor 760 to perform the operations described herein. Instructions 766 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 768 can include any electronic circuitry and/or logic circuitry to facilitate direct or indirect communication of data between the processor circuit 750, and other processors or devices. In that regard, the communication module 768 can be an input/output (I/O) device. In some instances, the communication module 768 facilitates direct or indirect communication between various elements of the processor circuit 750 and/or the fuel queue management system 100. The communication module 768 may communicate within the processor circuit 750 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the sensors may be accomplished using any suitable wireless or wired communication technology, e.g., a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the fuel queue management system advantageously provides a measurement or estimate of the time required to refuel at one or more nearby fueling stations. Accordingly, when compared to existing systems such as SOSS, the fuel queue management system 100 is more robust, more accurate, and provides clearer guidance to the consumer. Depending on the implementation, a number of variations are possible on the examples and embodiments described above. For example, the technology may be applied to different vehicle types, including on-road and off-road vehicles, three-wheeled vehicles, multi-wheeled vehicles, and aircraft. Other variables and other logical or arithmetic operations may be employed than those described above, in order to derive the wait times and fueling times.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the fuel queue management system or its components. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide an enabling description of the structure and use of exemplary embodiments of the fuel queue management system as defined in the claims. Although various embodiments of the claimed subject matter have been described above with a certain degree of particularity, or with reference to one or more individual embodiments, those skilled in the art would understand that numerous alterations to the disclosed embodiments are contemplated without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for in real time, estimating the time required for a vehicle to visit a fueling station, the system comprising:
   a fueling station server associated with the fueling station and configured to transmit, over a network, a plurality of fueling station parameters associated with the fueling station;
   a plurality of sensors disposed within the vehicle and configured to detect sensor data associated with the vehicle;
   a digital navigation system configured to compute, in real time, digital navigation data related to the vehicle and the fueling station, wherein the digital navigation data comprises a location of the vehicle, a location of the fueling station, and a route from the location of the vehicle to the fueling station;
   a non-transitory computer readable medium storing fuel tank parameters associated with a fuel tank of the vehicle; and
   a control unit disposed within the vehicle and configured to, in real time:
      based on the digital navigation data, automatically determine and store a travel time required for the vehicle to reach the fueling station;
      electronically receive, over the network, the fueling station parameters;
      based on the electronically received fueling station parameters, the sensor data, and the fuel tank parameters, automatically compute and store a fueling time required for the fueling station to fill the fuel tank; and
      automatically compute and store a total time requirement, comprising the stored travel time and the stored fueling time;
      electronically receive, over the network, a respective plurality of waiting vehicle parameters from each of at least one processor disposed on at least one respective waiting vehicle associated with the fueling station;

based on the electronically received fueling station parameters and the electronically received respective waiting vehicle parameters of the at least one waiting vehicle,
automatically compute and store a wait time associated with the at least one waiting vehicle;
automatically compute the total time requirement, further comprising the stored wait time;
a second fueling station server associated with a second fueling station and configured to transmit, over the network, a plurality of second fueling station parameters associated with the second fueling station,
wherein the digital navigation system is further configured to provide second digital navigation data related to the vehicle and the second fueling station,
wherein the control unit is further configured to, in real time:
electronically receive, over the network, the second fueling station parameters;
based on the second digital navigation data, automatically compute and store a second travel time required for the vehicle to reach the second fueling station;
based on the electronically received second fueling station parameters, the sensor data, and the fuel tank parameters, automatically compute and store a second fueling time required for the second fueling station to fill the fuel tank;
electronically receive, over the network, from each of at least one processor disposed on at least one respective waiting second vehicle associated with the second fueling station, a respective plurality of waiting second vehicle parameters;
based on the electronically received fueling station parameters and the electronically received respective waiting second vehicle parameters of the at least one waiting second vehicle, automatically compute and store a second wait time associated with the at least one waiting second vehicle; and
automatically compute and store a second total time requirement, comprising the stored second travel time, the stored second fueling time, and the stored second wait time;
automatically compare the stored total time requirement to the stored second total time requirement;
in a split-screen format, via a graphical user interface disposed within the vehicle, display to a driver of the vehicle:
the stored total time requirement in a first portion of the split screen;
the stored second total time requirement in a second portion of the split screen, wherein the stored total time requirement and the stored second total time requirement are ranked from smallest to largest; and
a dynamically generated map showing a current location of the vehicle in a third portion of the split screen;
in response to a current position of the vehicle, automatically updating the travel time requirement, the second travel time requirement, and the dynamically generated map;
in response to a number of vehicles detected at the fueling station or the second fueling station, automatically updating the wait time or the second wait time; and
in response to the updated travel time requirement, the updated second travel time requirement, the updated wait time, or the updated second wait time, automatically updating the displayed total time requirement or the displayed second total time requirement.

2. The system of claim 1, wherein the processor is further configured to report the total time requirement to a driver of the vehicle.

3. The system of claim 1, wherein the processor is further configured to display, on a display, a location of the vehicle, a location of the fueling station, and a location of the second fueling station.

4. The system of claim 1, wherein the processor is further configured to display at least a portion of the navigation data or the second navigation data.

5. The system of claim 1, wherein the waiting vehicle parameters include at least one of a pressure class of the waiting vehicle, a tank capacity of the waiting vehicle, a tank type of the waiting vehicle, a current fill level, a fuel pressure, or a fuel temperature.

6. The system of claim 1, wherein the at least one waiting vehicle is located within a geofenced area associated with the fueling station.

7. The system of claim 1, wherein the wait time includes a delay time between the end of a refueling of a waiting vehicle of the at least one waiting vehicle and the start of a refueling of a next waiting vehicle of the at least one waiting vehicle.

8. The system of claim 1, wherein the wait time includes a delay time between the end of a refueling of a waiting vehicle of the at least one waiting vehicle and the start of a refueling of the vehicle.

9. The system of claim 1, wherein the fueling station parameters comprise at least one of a location of the fueling station, a quantity of fuel, a temperature of the fuel, a pressure of the fuel, a number of dispensing nozzles available, an expected pre-cool time, an expected recompression time, a number of waiting vehicles, an identify of one or more waiting vehicles, a partial fill amount, an expected time of next fuel delivery, or an expected amount of next fuel delivery.

10. The system of claim 1, wherein the fuel tank parameters include at least one of a pressure class of the fuel tank, a capacity of the fuel tank, or a tank type of the fuel tank.

11. The system of claim 1, wherein the sensor data comprises at least one of a current fill level of the fuel tank, a fuel pressure, or a fuel temperature.

12. The system of claim 1, wherein the processor is further configured to:
receive, over the network, a number of waiting vehicles associated with the fueling station;
based on the number of waiting vehicles, estimate a wait time associated with the number of waiting vehicles; and
compute the total time requirement, further comprising the wait time.

13. The system of claim 1, wherein the dynamically generated map further shows a location of the fueling station or the second fueling station.

14. The system of claim 1, wherein the control unit is further configured to, in real time, in the split-screen format, via the graphical user interface disposed within the vehicle, replace the dynamically generated map with driving directions to one of the fueling station or the second fueling station.

15. The system of claim 14, wherein the control unit is further configured to, in real time, in the split-screen format, via the graphical user interface disposed within the vehicle, replace the driving directions with driving directions to the other of the fueling station or the second fueling station.

16. A computer-implemented method for estimating the time required for a vehicle to visit a fueling station, comprising, automatically:
    electronically receiving, over a network, from a fueling station server associated with the fueling station, a plurality of fueling station parameters associated with the fueling station;
    detecting, with a plurality of sensors disposed within the vehicle, sensor data associated with the vehicle;
    computing, in real time, with a digital navigation system, digital navigation data related to the vehicle and the fueling station, wherein the digital navigation data comprises a location of the vehicle, a location of the fueling station, and a route from the location of the vehicle to the fueling station;
    retrieving, from a non-transitory computer readable medium, fuel tank parameters associated with a fuel tank of the vehicle; and
    in real time, with a processor disposed within the vehicle:
        based on the navigation data, computing and storing a travel time required for the vehicle to reach the fueling station;
        based on the electronically received fueling station parameters, the sensor data, and the fuel tank parameters, computing and storing a fueling time required for the fueling station to fill the fuel tank;
        computing and storing a total time requirement, comprising the stored travel time and the stored fueling time;
        electronically receiving, over the network, a respective plurality of waiting vehicle parameters from each of at least one waiting vehicle associated with the fueling station;
        based on the electronically received fueling station parameters and the electronically received respective waiting vehicle parameters of the at least one waiting vehicle, computing and storing a wait time associated with the at least one waiting vehicle;
        electronically receiving, over the network, from a second fueling station server associated with a second fueling station, a plurality of second fueling station parameters associated with the second fueling station; and
        electronically receiving, over the network, from each of at least one waiting second vehicle associated with the second fueling station, a respective plurality of waiting second vehicle parameters;
        determining, with the navigation system, second navigation data related to the vehicle and the second fueling station;
        based on the second navigation data, computing and storing a second travel time required for the vehicle to reach the second fueling station;
        based on the electronically received second fueling station parameters, the sensor data, and the fuel tank parameters, computing and storing a second fueling time required for the second fueling station to fill the fuel tank;
        based on the electronically received second fueling station parameters and the respective waiting second vehicle parameters of the at least one waiting second vehicle, computing and storing a second wait time associated with the at least one waiting second vehicle;
        computing and storing a second total time requirement, comprising the second travel time, the second fueling time, and the second wait time;
        comparing the total time requirement to the second total time requirement; and
    in a split-screen format, via a graphical user interface disposed within the vehicle,
        displaying to a driver of the vehicle:
            the stored total time requirement in a first portion of the split screen;
            the stored second total time requirement in a second portion of the split screen, wherein the total time requirement and the second total time requirement are ranked from smallest to largest; and
            a dynamically generated map showing a current location of the vehicle in a third portion of the split screen;
        in response to a current position of the vehicle, automatically updating the travel time requirement, the second travel time requirement, and the dynamically generated map;
        in response to a number of vehicles detected at the fueling station or the second fueling station, automatically updating the wait time or the second wait time; and
        in response to the updated travel time requirement, the updated second travel time requirement, the updated wait time, or the updated second wait time, automatically updating the displayed total time requirement or the displayed second total time requirement.

17. The method of claim 16, further comprising, with the processor, reporting the total time requirement to a driver of the vehicle.

* * * * *